July 10, 1934.  D. P. FORBES  1,966,169
BRAKE DRUM
Filed Jan. 22, 1931
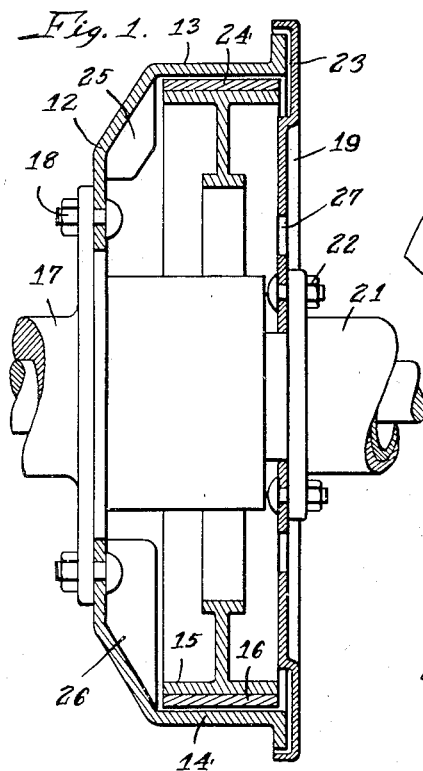
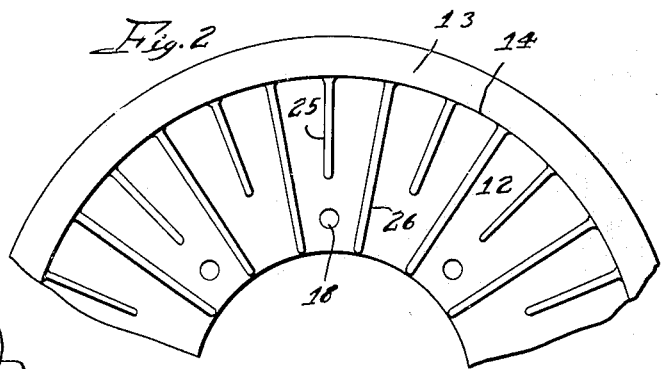
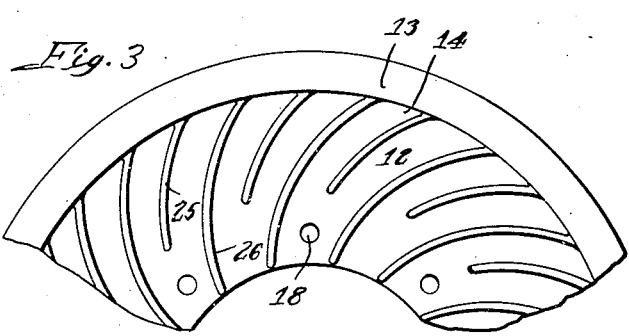
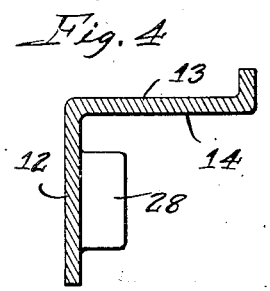 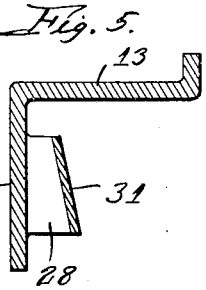 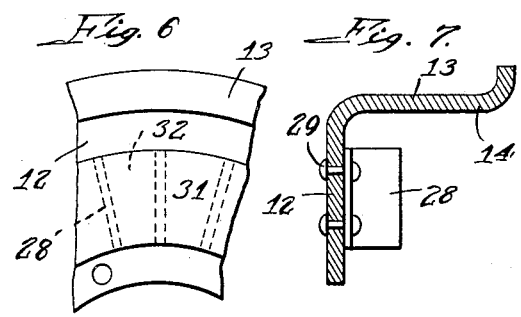
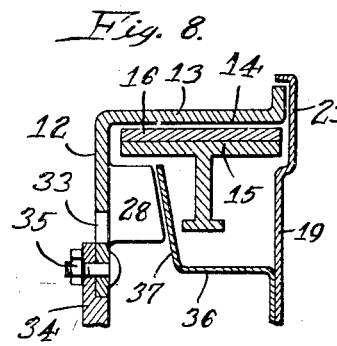 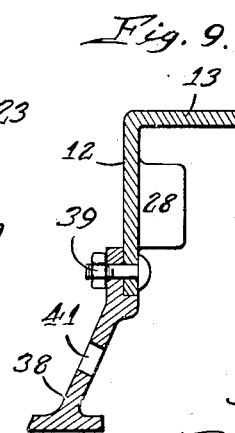 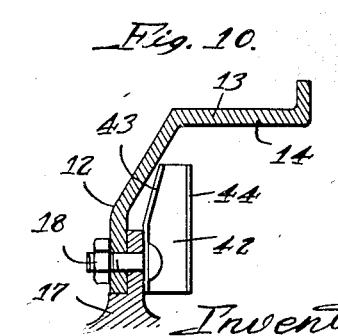
Inventor:
By Duncan P. Forbes
Wilson, Dowell, McCanna & Rehm
Attys.

Patented July 10, 1934

1,966,169

UNITED STATES PATENT OFFICE 1,966,169

BRAKE DRUM

Duncan P. Forbes, Rockford, Ill., assignor, by mesne assignments, to Gunite Foundries Corporation, Rockford, Ill., a corporation of Illinois Application January 22, 1931, Serial No. 510,491

6 Claims. (Cl. 188—264)

This invention relates to brake drums and has special reference to drums for use with internal expanding type brakes.

The cooling of brake drums in many instances becomes a problem of considerable importance. This is many times the case with brakes employed on large trucks and busses where the brake may be so placed as to be practically shielded from contact with air currents created by the moving vehicle. It therefore becomes desirable and in many instances necessary, to provide a supplemental means for dissipating the heat created by the contact of the frictional elements of the brake. Various additions have been made to satisfactorily bring about this cooling such for instance as the use of fins or ribs on the outer surface of the drum for the purpose of increasing the surface area and thereby increasing the cooling rate. Most of these devices have been successful in increasing to a limited extent the rate of cooling, but none of them have been directed to overcoming the difficulty at its source.

One of the principal objects of this invention is the provision of means for cooling the braking surface of the brake drum by providing a cooling circulation of air within the drum and directing at least a portion of this air to the braking surface thereof.

Another object of the invention is the provision of means for drawing air into the brake drum, passing the air through the opening between the braking surface of the drum and the brake shoes and discharging the air at the periphery of the drum.

Other objects and attendant advantages will become apparent to those skilled in the art from the following description and the accompanying drawing in which—

Figure 1 is a section through a brake drum embodying my invention showing the drum positioned upon a conventional hub;

Fig. 2 is a fragmentary front view of the drum showing one type of rib;

Fig. 3 is a fragmentary face view of the drum showing a second type of rib;

Fig. 4 is a fragmentary section of a drum of slightly different shape characteristics showing a modified form of rib;

Fig. 5 is a fragmentary section of a brake drum wherein the outer end of the ribs are connected by means of a circular strip;

Fig. 6 is a fragmentary face view of the modification shown in Fig. 5;

Fig. 7 shows a modification of the drum shown in Fig. 4 wherein the ribs are formed separate from the drum and are secured thereto by means of rivets;

Fig. 8 is a fragmentary view of a brake drum and dust shield wherein supplemental means are employed for directing the air; and Figs. 9 and 10 are modified forms of drums and ribs.

The invention contemplates the provision of a brake drum having a disk-like body or wall designated generally by the numeral 12, provided with a marginal flange 13. The inner surface 14 of the marginal flange 13 provides the braking surface of the drum against which the brake shoe 15 which is normally provided with a frictional surface 16, called a brake lining, is adapted to be pressed to stop the rotation of the wheel when the vehicle brakes are applied. The body 12 of the brake drum is secured to the wheel hub 17 by means of a series of bolts 18 and rotates with the wheel. It will be understood that in some instances the brake drum will be secured directly to the wheel but in any event, the drum will be so secured as to rotate with the wheel. A dust shield 19, usually consisting of a sheet metal disk of suitable shape characteristics, is secured to the axle housing 21 by means of bolts and nuts 22 and projects outward beyond the flange 13 thereby substantially closing the open end of the drum. However, in order to permit the drum to normally rotate freely with respect to the shield 19 which remains stationary during the movement of the vehicle, a space 23 is provided between the flange 13 and the dust shield 19.

When the brake shoes 15 occupy their normal released position a space 24 will exist between the brake lining 16 and the braking surface 14 of the drum. When the brake is applied the brake shoes 15 are so moved as to bring the lining 16 into frictional contact with the braking surface 14. During the braking operation the frictional contact between the lining 16 and the braking surface 14 develops a considerable amount of heat. It will be seen that the highest temperature will exist directly at the braking surface 14. Therefore, in cooling the drum the greatest effect will be had by directing the cooling operations to this point of highest temperature. It is, however impossible to completely prevent the drum from becoming heated by the application of the brake shoe and, as a result of this heating, the brake flange expands. With this expansion of the drum it is normally necessary to move the brake shoes through a greater distance in order to establish frictional contact with the flange, since the brake shoe normally remains in a relatively cool state, and, therefore, does not expand sufficiently to compensate for the increased diameter of the flange. This results in what is called "loss of pedal" the term indicating that it is necessary for the operator to depress the pedal further to apply the brake. However, if the air within the drum is circulated over the hot portion of the brake flange and over the brake shoes, the brake shoes will become heated sufficiently to follow the expanding brake drum and thereby largely eliminate loss of pedal. It is, therefore, desirable to reduce the local temperature of the braking surface and simultaneously increase the temperature of the associated parts of the brake, thus approaching a mean temperature by eliminating both extremes. This I have accomplished by circulating the air within the drum over the brake flanges and the brake shoes, and continuously replacing a part of the heated air within the drum by cold air from the exterior of the drum to maintain the mean temperature at a fairly low value. I have, therefore, provided ribs or fins 25 and 26 positioned on the body 12 of the drum and extending radially outward to a point adjacent to the opening 24, as shown in Figs. 2 and 3. These ribs may take a considerable variety of shapes, for example, in Fig. 2 I have shown straight radially positioned ribs of alternately short and long lengths, the shorter length ribs being opposite the bolt holes 18. In Fig. 3 I have shown ribs spirally positioned on the body 12 of alternately short and long lengths. The ribs may under certain circumstances, if desired, be all of the same length and various changes may be made in the shape characteristics of the ribs to suit particular circumstances.

It will be seen from Fig. 1 that when the shoes 15 occupy their released positions and the drum is rotated, air will be drawn inward through openings 27 in the dust shield and will be carried outward by the ribs 25 and 26 through the space 24 between the brake lining 16 and the braking surface 14, emerging from the drum through the space 23 between the marginal flange and the dust shield. Thus, during the rotation of the drum a continuous flow of air will be maintained through the opening 27 and over the braking surface 14. In this manner the cooling air currents are directed to the very point at which the heat is generated and to the hottest portion of the drum.

A further function of the ribs 25 and 26, is to reenforce the body 12 of the drum. Because of the provision of these ribs cross-sectional area of the body 12 may be considerably reduced thereby somewhat reducing the weight of the drum.

In Figs. 4, 5, 6, 7, 8, and 9, I have shown a brake drum of the plain type in which the flange 13 meets the body 12 in substantially a right angle. In this type of drum the ribs 28, which, as previously stated, may be of a wide variety of shape characteristics may either be formed integrally with the drum as shown in Fig. 4, or may be formed separately as shown in Fig. 7, and may be secured to the drum by means of rivets 29 as shown in Fig. 7.

In Figs. 5 and 6, I have shown a modification of the drum shown in Figs. 4 and 7, wherein a plate, annulus, or disk 31 is secured to or formed on the free edges of the ribs 28, the width of the ring being substantially equal to the length of the ribs. This construction provides a series of channels or conduits 32 bounded by the body 12, the ring 31, and successive ribs 28. These channels are constricted at their outer end as shown in Fig. 5 whereby the velocity of the air passing outward through the channels 32 is increased during its passage therethrough.

Fig. 8 shows a modified type of drum somewhat similar to that shown in Fig. 4. In this instance a series of openings 33 are provided through the body 12 between successive ribs 28 for admitting air to the interior of the drum. The body 12 may be secured to a portion 34 of the wheel hub by means of bolts and nuts 35. A metal disk 36 of suitable shape characteristics is secured to the dust shield 19 and is provided with a ring shaped portion 37 spaced slightly from the free edges of the ribs 28. Suitable openings may be provided in the disk 36 to permit the brake shoes 15 to be operated in the customary manner. It will be seen that the disk 36, being secured to the dust shield 19, will remain stationary and that the drum and ribs 28 will rotate with respect thereto. The outer edges of the ribs 28 may be advantageously sloped with respect to the body 12 and the ring 37 to give any corresponding slope, whereby the air passageways are slightly constricted toward their outer ends, thus increasing the velocity of the air passing therethrough. In Fig. 9 I have shown a further manner in which air may be introduced into a drum of the type shown in Fig. 8. In this instance the drum is supported upon a bracket 38 forming a portion of the wheel hub by means of bolts and nuts 39. In this type of hub construction openings 41 may be provided in the bracket 38 to admit air to the interior of the drum at a point near the axis of rotation thereof.

In Fig. 10, I have shown a modified structure of a dished type brake drum. In this instance the body 12 is secured to the hub 17 by means of bolts and nuts 18 in the same manner as that shown in Fig. 1. Ribs 42 having rear flanges 43 are secured to the inner side of the flange 17 by the bolts 18. In this instance I have shown ribs having flanges 44 formed on their free edge to aid in confining the air and in directing the same along the inner surface of the drum.

In each of the modifications, it will be observed, that I have arranged the ribs in such a manner as to move the air from the inner edge of the marginal flange 13 outward over the braking surface 14 to the periphery of the drum, thereby passing the air over the portion of the drum subject to the highest temperature. Means may be provided such as the disks 31 and 36 for partially confining and directing the air currents created by the ribs. Where convenient, the invention contemplates the provision of openings such as the openings 27 and 33 connecting the interior of the drum with the outside atmosphere at points near the axis of rotation of the drum and a space 23 between the marginal flange 13 and the dust shield 19 for the discharge of the air currents. This arrangement permits air to be drawn into the drum, carried over the braking surface 14 and discharged at the periphery of the drum, thus constantly supplying fresh cool air. However, even though such a circulation of air is not possible, the ribs will serve to circulate the air contained within the drum and thereby function to cool the braking surface.

It will also be seen that the movement of air as contemplated serves not only to cool the braking surface of the drum but also the surface of the friction element. This is a matter of some importance since the elements are customarily formed of insulating material such as asbestos and the heat generated at the surface thereof is conducted away through the material itself but very slowly. Unless the surface of this element is cooled simultaneously with the cooling of the braking surface, thorough cooling of the braking system cannot be accomplished. The present invention provides means for simultaneously cooling both the braking surface of the drum and the friction element by directing a flow of air over the hottest portions of each.

The ribs may take any of a wide variety of shapes so long as they serve to carry the air in the desired direction and to reenforce the body of the drum, it being obvious that the shape and position of the ribs will depend to a certain extent upon the design of the drum and brake.

The invention is described in connection with the brakes of a motor vehicle but it will be understood to be applicable to brakes employed for other purposes and the specification and claims should be so read.

While I have thus described and illustrated a specific embodiment of my invention, I am aware that numerous alterations and changes may be made therein without materially departing from the spirit of the invention and the scope of the appended claims.

I claim:

1. In an internal expanding brake, a rotatable drum having a body and a marginal flange providing a braking surface, a dust shield spaced from the edge of said marginal flange, a stationary disk secured to said shield spaced from said body, a plurality of ribs on said body between said body and said disk adapted to circulate the air within said drum and over said braking surface, and means for admitting air into said drum near the axis of rotation thereof, to replace a portion of the heated air within said drum.

2. A brake cooling device comprising a brake drum including a wall and a flange, a plurality of fins radially disposed relative to and their edges connected with the brake drum and stopping short of both the center and flange of the drum structure, and an annular plate cooperating with said fins to form a plurality of radially disposed conduits.

3. A brake cooling device comprising a brake drum having a wall and a flange, a plurality of radial fins arranged in an annular row about and connected to the brake drum, and spaced away from the flange of the drum, and a member closing the intervals between the fins at their edges opposite their connection with the drum.

4. A brake cooling device comprising a brake drum having a wall and a flange, a plurality of radially disposed fins, and an annulus rigidly secured to the fins and to the brake drum, forming radially disposed conduits.

5. A brake cooling device comprising a brake drum having a wall and a flange, an annulus spaced away from the flange and from the wall of the brake drum, and air moving devices interposed between the annulus and the wall of the drum.

6. In an internal expanding brake, a rotatable drum having an imperforate body and a marginal flange providing a braking surface, a plurality of spaced radial ribs on the inner side of said body adapted to circulate the air within said drum and direct a flow of air over said braking surface and the brake shoe, and a disk positioned along the outer edges of said ribs to form channels defined by the disk, the body, and the ribs, whereby to confine the air as it moves outward between said body, said disk, and said ribs.

DUNCAN P. FORBES.